United States Patent [19]

Goossens et al.

[11] Patent Number: 4,620,869
[45] Date of Patent: Nov. 4, 1986

[54] CLEAN ROOM HEAD ASSEMBLY

[75] Inventors: Harry J. Goossens, Grandville, Mich.; Frederic E. Kamper, Redlands, Calif.

[73] Assignee: Clean Rooms International, Grand Rapids, Mich.

[21] Appl. No.: 698,107

[22] Filed: Feb. 4, 1985

[51] Int. Cl.$^4$ ............................................. B01D 46/00
[52] U.S. Cl. .................... 55/385 A; 55/502; 98/40.1; 98/40.11
[58] Field of Search .............. 98/40.01, 40.1, 40.11, 98/36; 55/385 A, 418, 484, 502

[56] References Cited

U.S. PATENT DOCUMENTS

| 3,170,385 | 2/1965 | Tompkins et al. | 98/36 |
| 3,185,181 | 5/1965 | Demyan | 138/37 |
| 3,323,437 | 6/1967 | Knab | 98/40.1 |
| 3,548,735 | 12/1970 | Sweeny | 98/40.11 |
| 3,553,941 | 1/1971 | Wittemeier et al. | 98/40.1 |
| 3,866,950 | 2/1975 | Skoch et al. | 285/4 |
| 3,906,846 | 9/1975 | Day | 98/108 X |
| 3,948,155 | 4/1976 | Hedrick | 98/114 X |
| 4,034,659 | 7/1977 | Raider | 55/418 X |
| 4,088,463 | 5/1978 | Smith | 55/502 X |
| 4,178,159 | 12/1979 | Fectean | 55/502 X |
| 4,217,121 | 8/1980 | Fichter | 55/502 X |

FOREIGN PATENT DOCUMENTS 495092 3/1976 U.S.S.R. ............................ 55/418

OTHER PUBLICATIONS

CRFM, (Ceiling Removable Filter Module).
"Clean Rooms", Weber Technical Products, Copyright 1975.

Primary Examiner—Harold Joyce
Attorney, Agent, or Firm—Varnum, Riddering, Schmidt & Howlett

[57] ABSTRACT

A vertical-flow air diffuser plenum assembly wherein a generally rectangular hood is formed of a single piece of sheet material in a generally pyramidal rectangular shape and a HEPA filter is mounted beneath the hood in a filter housing in airtight relationship with the hood. The hood has a plurality of smooth continuous horizontal ridges extending 360° around the hood between the apex of the hood and a bottom opening thereof. The ridges are spaced between the apex and the bottom of the hood so as to deflect air flowing along the hood inside surface downwardly through the filter medium in a substantially uniform flow pattern thereacross. The ridges are joined by sloping wall portions and have smoothly rounded corners free from creases or breaks in the surface.

15 Claims, 6 Drawing Figures

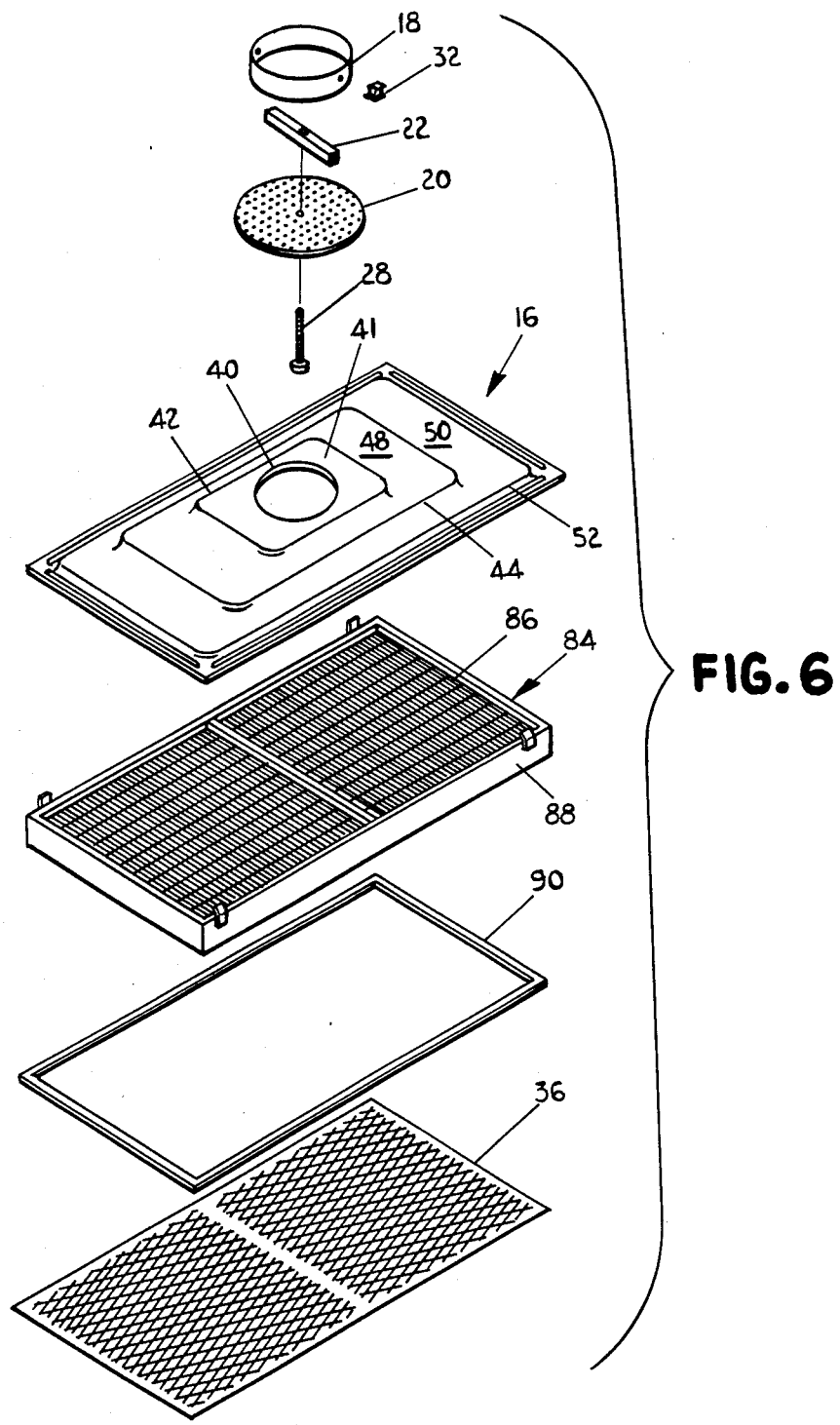

CLEAN ROOM HEAD ASSEMBLY

TECHNICAL FIELD

This invention relates to air plenum assemblies for clean room and other environments which require air filtration. In one of its aspects, the invention relates to air plenum assemblies for delivering filtered air to room enclosures for so-called clean room environments.

BACKGROUND OF THE INVENTION

The term "clean room" is a term used to refer to an enclosed room in which air is delivered in highly filtered form to produce a substantially dirt and dust free environment. These types of rooms are used for sensitive manufacturing processes, for example, in the electronics and microcircuitry industry.

Typically, filter modules, for example 2×4 feet, are mounted in open gridwork patterns in the ceiling and are thus ganged together to produce a relatively uniform flow of air between the ceiling and floor of the room. The air is removed from the bottom of the room and recycled. Each filter module is independent of the other and has a quantity of air supplied to it. Air is diffused and passed through the filter module into the room through the air plenum assemblies. The diffusion of the air is important for uniform flow of air through the filter and into the room. Typically, air enters the plenum assembly at a central portion of the unit and is deflected laterally with an adjustable horizontal plate before passing through the filter medium. Typically, the plate is perforated so that some of the air passes through a central portion of the filter. One prior art filter plenum has a horizontal top wall along which the air flows. In this type of system, the air flow is not well distributed over the length or width of the filter medium.

Another prior art system is disclosed in the Knab U.S. Pat. No. 3,323,437 (issued June 6, 1967). Knab discloses a filter module with a frusto-converging hood. Radial creases are formed between the open bottom and the apex at the center of the hood to form triangular surfaces which deflect the air downwardly through the filter medium.

DISCLOSURE OF INVENTION

A vertical-flow air diffuser plenum assembly has a generally rectangular hood formed of a unitary piece of sheet material in a generally pyramidal rectangular shape and includes an air supply opening at an apex thereof and an open bottom. Means are provided for connecting a source of air supply to the air supply opening in the hood. A deflector is mounted in the hood beneath the air supply opening to at least partially deflect air entering the hood through the air supply opening in a lateral direction along the inside surface of the hood. A rectangular filter medium is mounted beneath the open bottom of the hood and in air flow relationship therewith so that air entering the air supply opening passes through the filter medium. In accordance with the invention, the apex of the hood is formed by a substantially horizontal wall portion. The hood has a plurality of smooth, continuous horizontal ridges extending 360° around the hood between the apex and the bottom opening thereof. The ridges are spaced between the apex and bottom of the hood and shaped so as to deflect the air flowing along the hood inside surface downwardly through the filter medium in a substantially uniform flow pattern across the surface of the filter medium. Preferably, the ridges are joined by sloping wall portions of the hood. Smoothly rounded corners, free from creases or breaks, characterize the ridges.

The hood has a relatively low profile with the length to height ratio of the hood being generally in the range of 10-30 and preferably about 20.

Typically, a rectangular filter housing is mounted in airtight relationship to the bottom of the hood and the filter medium is mounted within the filter housing. A grill is preferably mounted to the rectangular filter housing beneath the filter medium. In one embodiment, a filter medium within a frame is mounted within a separate housing to which the hood is attached, thus allowing for filter removal from the room through a removable grille. The deflector is typically mounted for vertical adjustment with respect to the hood so that the flow of air along the inside surface of the hood can be modified as desired.

A plurality of plenum assemblies according to the invention are typically mounted in side-by-side fashion in gridwork in an open ceiling in a room. Pressurized air from a source is supplied through a conduit or plenum to the air diffuser plenum assemblies to supply air to the room.

BRIEF DESCRIPTION OF DRAWINGS

The invention will now be described with reference to the accompanying drawings in which:

FIG. 6 is a view like FIG. 5 illustrating another embodiment of the invention.

BEST MODE FOR CARRYING OUT THE INVENTION

Figure 1:
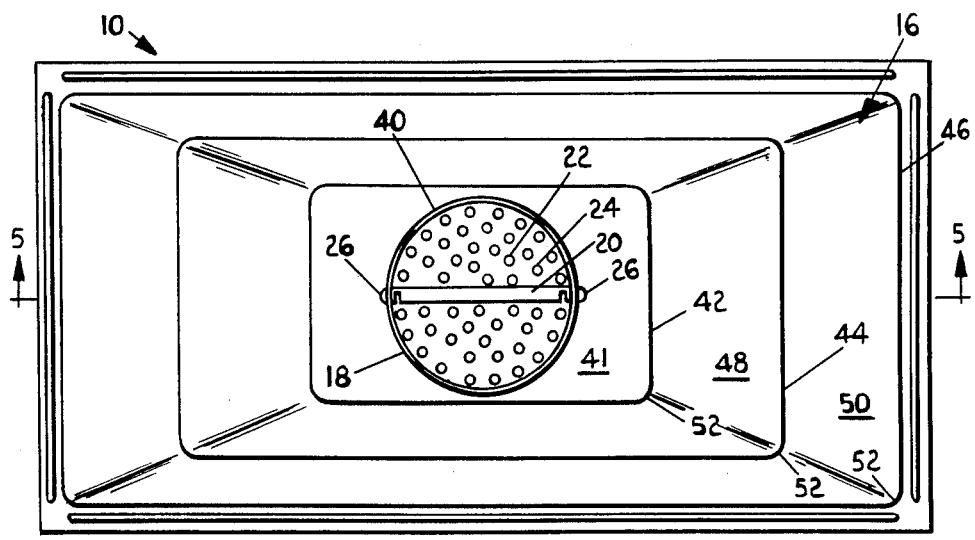
FIG. 1 is a plan view of an air diffuser plenum assembly according to the invention.
Figure 2:
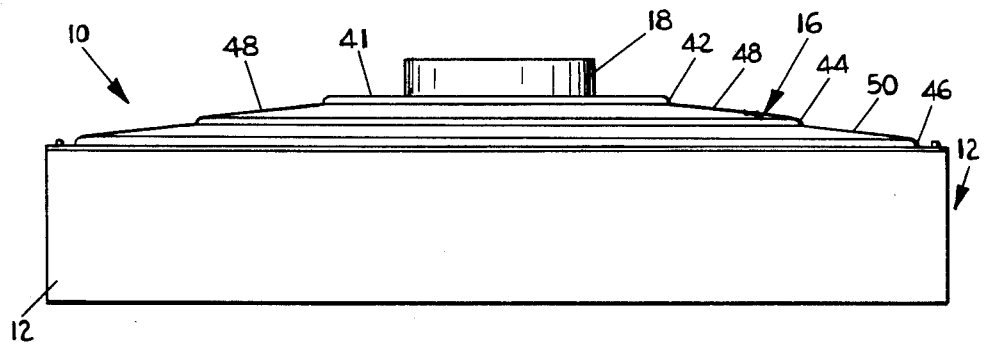
FIG. 2 is a side elevational view of the plenum illustrated in FIG. 1.
Figure 3:
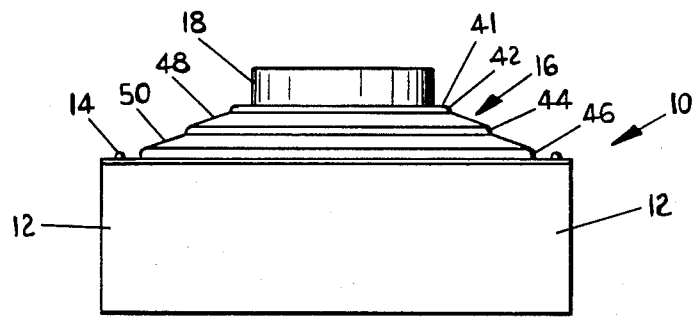
FIG. 3 is an end elevational view of the plenum assembly illustrated in FIGS. 1 and 2.

Referring to the drawings, and to FIGS. 1-3 in particular, there is shown a vertical-flow air diffuser plenum assembly 10 having a rectangular filter housing 12 and a rectangular hood 16. A duct collar 18 is secured to the rectangular hood 16 at a central opening 40 thereof for connecting the plenum assembly to a source of air supply. A damper mounting bracket 20 is mounted in the duct collar 18 and mounts a disc damper/diffuser plate 22 with a plurality of holes 24 through an adjustment screw 28. Screws 26 or spot welds extend through the duct collar 18 and secure the damper mounting bracket 20 thereto.

Figure 4:
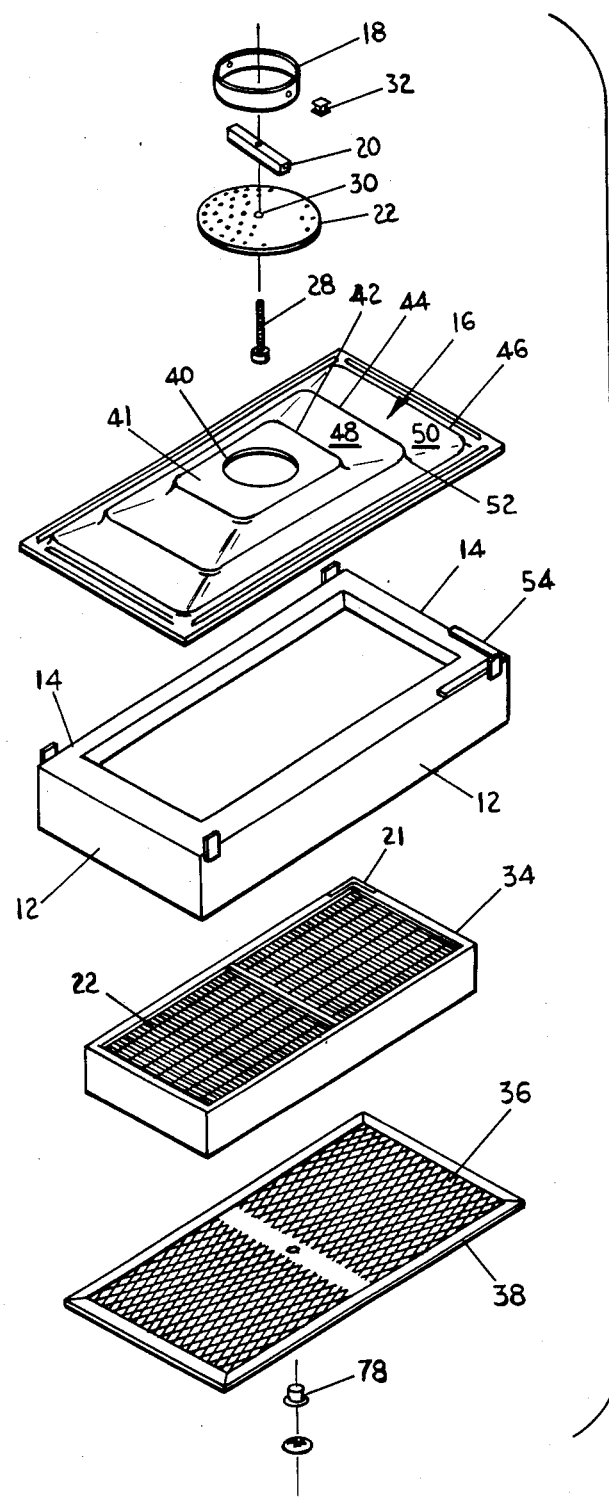
FIG. 4 is an exploded view of the plenum assembly illustrated in FIGS. 1-3.
Figure 5:
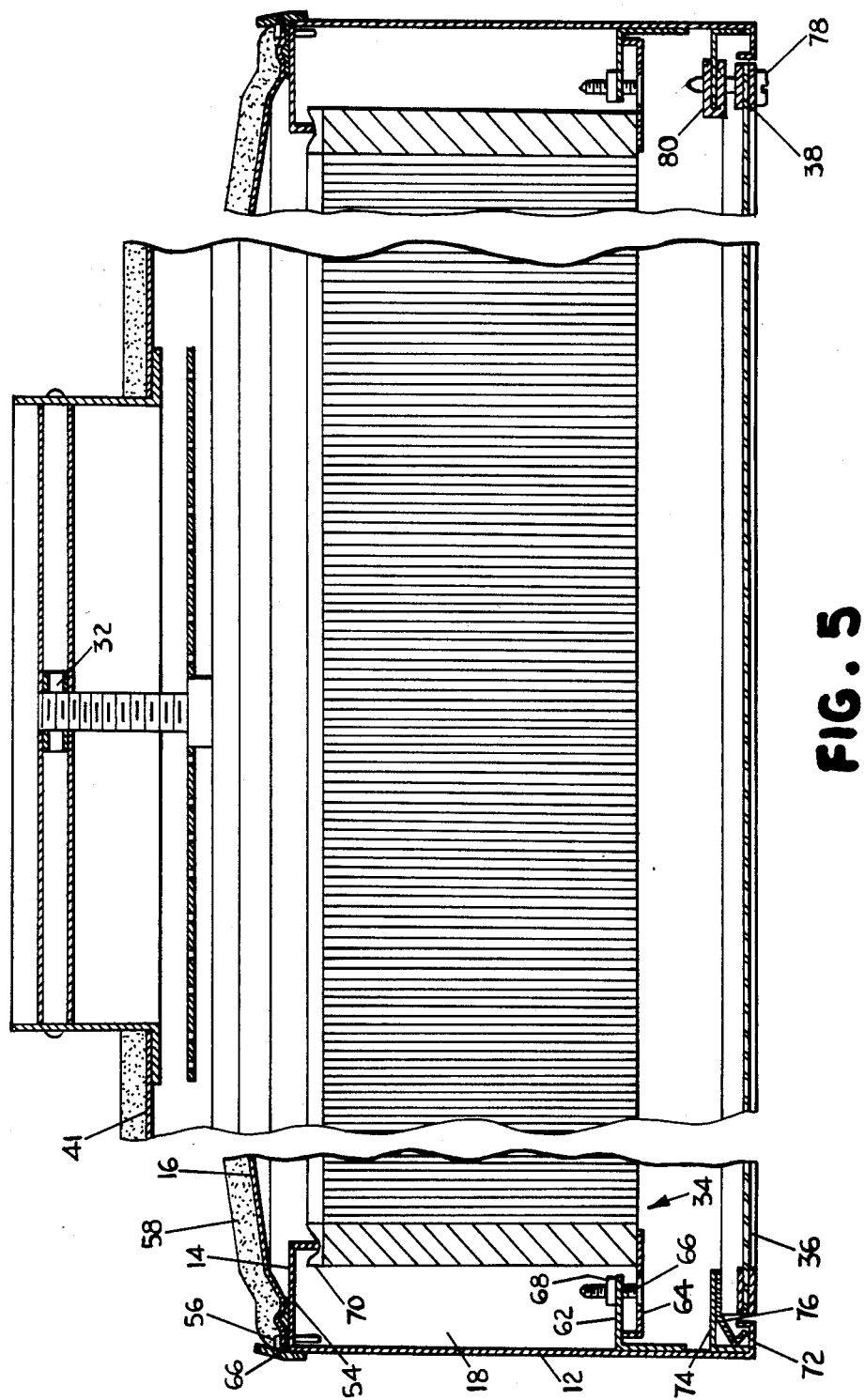
FIG. 5 is a segmented sectional view taken along line 5—5 of FIG. 1

As seen in FIG. 4, an adjustment screw 28 extends through a central opening 30 in the disc damper/diffuser plate 22 and into the damper mounting bracket 20. A bushing 32 threadably engages the threads on the adjustment screw 28 to adjustably secure the adjustment screw 28 to the damper mounting bracket 20. As seen in FIG. 5, the bushing 32 fits within the hollow interior of the damper mounting bracket 20. The disc damper/diffuser plate 22 rests on the head of the adjustment screw 28.

Referring now to FIG. 4, a HEPA filter unit 34 is mounted within the rectangular filter housing 12 and a grille 36 having a peripheral frame 38 is mounted in the filter housing 12 beneath the HEPA filter unit 34 in spaced relationship thereto. HEPA filters are well known in the clean room art and generally remove 99.97% or more of particles 3 microns and larger.

Referring to FIGS. 1-4, the rectangular hood 16 is preferably formed from a single piece of sheet material in a generally pyramidal rectangular shape and includes an air supply opening 40 at the apex thereof. The apex of the hood is formed by a horizontal wall 41 extending outwardly from the central opening 40. The hood 16 has an open bottom for flow of air into the filter housing 12. The pyramidal shape of the hood is achieved by a plurality of smooth, continuous horizontal ridges 42, 44 and 46 extending 360° around the hood between the apex and the open bottom thereof. The ridges are spaced between the apex and the bottom of the hood so as to deflect air flowing along the hood inside surface downwardly through the filter medium in a substantially uniform flow pattern. To this end, the ridges are joined by sloping wall portions 48 and 50 and the ridges 42, 44 and 46 have smoothly rounded corners 52 so that the hood is free of creases or breaks in the surface thereof.

The number of ridges can vary depending on the ratio of maximum length to height. Ordinarily, the hood will have a low profile so that the ratio of maximum length to height is about 10-30, and preferably is about 20. The number of ridges can vary between 2 and 6 with the preferred number being 3 when the ratio of maximum length to height is about 20.

The hood is typically manufactured by a drawing process by hydroforming. The preferred material is low carbon steel but aluminum and its alloys or stainless steel or a non-metallic synthetic material such as ABS plastic can also be used.

Referring to FIG. 5, closed cell gasket material 54 extends around the upper rim 14 of the rectangular filter housing 12 and forms an airtight seal between the peripheral rim of the rectangular hood 16 and the filter housing 12. Metal screws 56 or staples extend through the peripheral flange of the hood 16 and through the upper rim 14 to securely fasten the hood 16 to the filter housing 12. In a preferred embodiment of the invention, insulation is provided on top of the hood 16 and is secured in place by a suitable tape 60.

A mounting flange 62 is provided on the lower inside surface of the filter housing 12. This flange 62 mounts a number of nuts 68 which threadably receive machine screws 66. A number of filter clamps 64 are mounted to the flange 62 through machine screws 66. The clamps 64 bear against the bottom of the peripheral housing of the HEPA filter unit 34 and force the housing against a depending flange of the upper rim 14. A gasket 70 is provided on the upper surface of the rim of the HEPA filter unit 34 to seal the periphery of the filter unit 34 to the upper rim 14. Thus, air passing into the hood 16 through the central opening thereof is forced through the HEPA filter unit 34. The HEPA filter unit can be easily removed from the filter housing 12 by loosening the screw 66 and rotating the clamps 64 with respect to the mounting flanges 62.

The filter housing 12 further has a retaining flange 72 at the bottom thereof and an abutting flange 74 spaced vertically above and extending slightly further into the central portion of the housing. The grille 36 has a hinge flange 76 which fits within the retaining flange 72 and which abuts the abutting flange 74. The hinge flange 76 forms a hinge with the retaining flange 72. The grille is secured in position beneath the HEPA filter unit 34 and in spaced relationship thereto through screws 78 which pass through one side of the frame 38 of the grille 36 and is threaded through a metal clip 80 on abutting flange 74 opposite the hinge flange 76.

In operation, a plurality of plenum assemblies are mounted in an open gridwork pattern in side-by-side relationship in a room. Air is supplied from a pressure source to the filter unit through the collar 18. As the air enters the central opening 40 of the hood 16, it is at least partially deflected laterally by the disc damper/diffuser plate 22. A portion of the air, however, will pass through the holes 24 and will pass vertically downwardly through the HEPA filter in a central portion thereof. The remainder of the air will pass along the inside surface of the rectangular hood 16 and will be deflected downwardly and/or angularly thereof as it moves laterally along the inside surface of the hood. Portions of the air will be deflected downwardly by the ridge 42, other portions will be deflected downwardly by the ridge 44 and other portions will be deflected by the ridge 46. The sloping wall portions 48 and 50 will also direct the air downwardly.

Referring now to FIG. 6, there is shown a vertical air-flow difuser plenum assembly of a disposable type. Like numerals have been used to designate like parts with the embodiment shown in FIGS. 1-5. The plenum assembly has a rectangular hood 16 with a duct collar 18 secured at a central opening 40 for connecting the plenum assembly to a source of air supply. A damper mounting bracket 20 is mounted in the duct collar 18 and mounts a disc/damper diffuser plate 22 with a plurality of holes 24. The damper mounting bracket 20 is secured to the duct collar 18 and supports the damper/diffuser plate 22 through adjustment screw 28. The rectangular hood 16 is of identical construction with the hood 16 illustrated in FIGS. 1-5.

A HEPA filter unit 84 has a central HEPA filter 86 surrounded by a wood or metal frame 88. Tape strips 90 are positioned on the bottom of the wood frame 88 and a grille 36 is secured to the frame 88 through suitable fastening means (not shown). In this embodiment, the rectangular hood 16 is secured directly to the frame 88 without any further housing. Thus, when the filter becomes dirty or clogged, the entire unit is disposed of.

In tests conducted with respect to the diffuser assembly according to the invention, including a rectangular hood 16 as shown in the drawings, it was found that a very uniform pattern of distribution of the air flow downwardly through a HEPA filter was achieved.

Thus, the invention provides a simple, relatively inexpensive and effective air diffuser plenum assembly. The assembly can be inexpensively manufactured but is effective to provide a substantially uniform flow of air through the HEPA filter and through the bottom of the grille.

Reasonable variation and modification are possible within the scope of the foregoing disclosure and drawings without departing from the spirit of the invention.

We claim:

1. In a vertical-flow air diffuser plenum assembly having:
   a generally rectangular hood formed of a unitary piece of sheet material in a generally pyramidal rectangular shape and including an air supply opening at an apex thereof and an open bottom;

means for connecting a source of air supply to said air supply opening in said hood;

a deflector mounted in said hood beneath said air supply opening to at least partially deflect air entering said hood through said air supply opening in a lateral direction along the inside surface of said hood;

a rectangular filter medium;

means for mounting said rectangular filter medium beneath the said open bottom of said hood and in generally air-flow relationship therewith so that air entering said air supply opening passes through said filter medium;

the improvement in said hood which comprises:

the hood apex is formed by a substantially horizontal wall; and a plurality of smooth continuous horizontal, generally rectangular ridges extending 360 degrees around said hood between said apex and said bottom opening thereof, said ridges being spaced between the apex and bottom of said hood and shaped so as to deflect air flowing along said hood inside surface downwardly through said filter medium in a substantially uniform flow pattern thereacross.

2. A vertical-flow air diffuser plenum assembly according to claim 1 wherein said ridges are joined by sloping wall portions of said hood.

3. A vertical-flow air diffuser plenum assembly according to claim 2 wherein said ridges are further characterized by smoothly rounded corners free from creases or breaks in the surface thereof.

4. A vertical-flow air diffuser plenum assembly according to claim 3 wherein said hood has a relatively low profile with a maximum length-to-height ratio in the range of 10 to 30:1.

5. A vertical-flow air diffuser plenum assembly according to claim 4 wherein the ratio of maximum length-to-height of said hood is about 20.

6. A vertical-flow air diffuser plenum according to claim 5 wherein said means for mounting said rectangular filter medium beneath said open bottom of said hood comprises a rectangular filter housing mounted to the bottom of said hood, said filter housing having vertical side walls.

7. A vertical-flow air diffuser plenum according to claim 6 and further comprising a grille mounted to said rectangular filter housing beneath said filter medium.

8. A vertical-flow air diffuser plenum assembly according to claim 1 and further comprising means for vertically adjusting the deflector with respect to the hood for adjusting the flow of air along the inside surface of said hood.

9. A vertical-flow air diffuser plenum according to claim 1 wherein said hood is further characterized by smoothly rounded corners free from creases or breaks in the surface thereof.

10. A vertical-flow air diffuser plenum assembly according to claim 9 wherein said hood has a relatively low profile with a maximum length-to-height ratio in the range of 10 to 30:1.

11. A vertical-flow air diffuser plenum assembly according to claim 10 wherein the ratio of maximum length-to-height of said hood is about 20.

12. A vertical-flow air diffuser plenum assembly according to claim 1 wherein the ridges have smoothly rounded surfaces free of breaks or creases in the surface of said hood.

13. A vertical-flow air diffuser plenum assembly according to claim 12 wherein said hood has a relatively low profile with a maximum length-to-height ratio of about 20.

14. A vertical-flow air diffuser plenum assembly according to claim 1 wherein said hood has a relatively low profile with a maximum length-to-height ratio in the range of 10 to 30:1.

15. A vertical-flow air diffuser plenum assembly according to claim 1 wherein said hood has a relatively low profile with a maximum of length-to-height ratio of about 20.

* * * * *